US005556058A

United States Patent [19]

Bender

[11] Patent Number: 5,556,058
[45] Date of Patent: Sep. 17, 1996

[54] SPACECRAFT ATTITUDE DETERMINATION USING SUN SENSOR, EARTH SENSOR, AND SPACE-TO-GROUND LINK

[75] Inventor: Douglas J. Bender, Redondo Beach, Calif.

[73] Assignee: Hughes Electronics, Los Angeles, Calif.

[21] Appl. No.: 243,669

[22] Filed: May 16, 1994

[51] Int. Cl.⁶ .................. B64G 1/24; B64G 1/36
[52] U.S. Cl. .................. 244/171; 244/164; 244/165
[58] Field of Search .................. 244/158 R, 164, 244/165, 171; 364/434

[56] References Cited

U.S. PATENT DOCUMENTS

| | | | |
|---|---|---|---|
| 3,813,067 | 5/1974 | Mork | 244/165 |
| 4,119,972 | 10/1978 | Fletcher | 343/844 |
| 4,358,076 | 11/1982 | Lange et al. | 244/164 |
| 4,725,024 | 2/1988 | Vorlicek | 244/164 |
| 4,931,942 | 6/1990 | Garg et al. | 244/164 |
| 5,020,744 | 6/1991 | Schwarzschild | 244/164 |
| 5,042,752 | 8/1991 | Sarauer et al. | 244/164 |
| 5,080,307 | 1/1992 | Smay et al. | 244/164 |
| 5,100,084 | 3/1992 | Rahn et al. | 244/165 |
| 5,139,218 | 8/1992 | Bird et al. | 244/165 |
| 5,140,525 | 8/1992 | Shankar et al. | 244/164 |
| 5,257,759 | 11/1993 | Bender | 244/171 |
| 5,349,532 | 9/1994 | Tilley et al. | 244/171 |

*Primary Examiner*—Andres Kashnikow
*Assistant Examiner*—Virna Lissi Mojica
*Attorney, Agent, or Firm*—Terje Gudmestad; Elizabeth E. Leitereg; Wanda K. Denson-Low

[57] ABSTRACT

A method and system for determining the general three-axis attitude measurement for a spacecraft is disclosed. The system provides a cost-effective attitude measurement system for geosynchronous momentum bias spacecraft which need a continuously updated, moderately accurate, yaw measurement in addition to the usual roll and pitch measurements. The continuous yaw measurement enables control of the spacecraft yaw axis in the presence of disturbance torques. A sun sensor generates a signal which may be used to calibrate a continuously updated yaw measurement derived from the combination of signals generated by an Earth sensor and a space-to-ground link.

19 Claims, 2 Drawing Sheets

SPACECRAFT ATTITUDE DETERMINATION USING SUN SENSOR, EARTH SENSOR, AND SPACE-TO-GROUND LINK

TECHNICAL FIELD

This invention relates to a system and method for determining a yaw attitude measurement of a spacecraft.

BACKGROUND ART

Spacecraft such as satellites employ a number of sensors to determine their relative orientation in space. An accurate indication of the spacecraft orientation is important for properly controlling the positioning of various spacecraft components, such as solar wings or communication antennas. Typically, spacecraft attitude measurements characterize spacecraft orientation relative to the pitch, roll, and yaw axes of the spacecraft. Depending upon the particular application, the spacecraft orientation measurements may be indicated directly by appropriate sensors or derived indirectly from those sensors.

Momentum bias spacecraft utilize a momentum wheel which, typically, spins about the pitch axis so as to create a momentum bias nominally along that axis. This momentum bias provides "gyroscopic stiffness" to resist roll and yaw axis disturbance torques which attempt to perturb the spacecraft pitch axis from orbit normal. Thus, a larger momentum bias provides greater gyroscopic stiffness but also makes controlling the spacecraft more difficult.

The gyroscopic effect also couples the roll and yaw dynamics. Prior art spacecraft control systems have recognized and utilized this coupling to control both the roll and yaw axes while directly sensing only the roll axis and deriving a yaw measurement from the roll sensor. The efficacy of this control strategy is proportional to the magnitude of the momentum bias. Thus, for a relatively small momentum bias (typically 20–80 N-m-sec on a geosynchronous communications satellite), with no direct sensing of the yaw attitude, the yaw attitude cannot be controlled very accurately.

At present, commercially available geosynchronous momentum bias satellites do not have a device for direct measurement of the satellite yaw attitude. Instead, these satellites utilize the control strategy described above to derive a yaw attitude measurement from a roll sensor. The derived yaw attitude measurement is then utilized by the control system to properly position the satellite or its components. For example, the derived yaw attitude measurement may be used to point a satellite communication antenna toward a predetermined target.

Since this control strategy requires a compromise between the size of the momentum bias and the accuracy of the spacecraft pointing, this system typically has limited accuracy and is sensitive to significantly large time-varying disturbance torques. Such a system is inadequate for use in a data relay spacecraft with large slewing antennas which experiences large time-varying disturbances due to the antenna slews, and the like. These applications require accurate yaw pointing in order to provide antenna pointing service to target locations which are off Earth nadir.

Commercially available satellites, including data relay spacecraft, often include an analog sun sensor. The analog sun sensors are typically mounted on the solar wings of the spacecraft. These sun sensors provide a coarse yaw measurement during a large portion of the day, while an Earth sensor provides roll and pitch measurements. However, due to their location on the solar wings, the analog sun sensors are subject to bias and distortions. More importantly, near solar equinox, there are periods spanning close to two hours occurring twice daily when no yaw measurement is available. This occurs because, during those periods, the line from the spacecraft to the sun is nearly along the spacecraft yaw axis.

Many satellites have been flown with digital, rather than analog, sun sensors as part of their attitude measurement systems. For example, the standard architecture for NASA's low-Earth-orbit mapping satellites includes a digital sun sensor. The digital sun sensor is typically a redundant component which functions only as a backup in case one of the two star sensors fails.

SUMMARY OF THE INVENTION

Therefore, it is an object of this invention to provide a system which produces a continuously updated yaw measurement for an orbiting spacecraft.

Another object of the present invention is to provide a system which utilizes a digital sun sensor to calibrate a continuously updated yaw measurement derived from the combination of ground beacon and Earth sensors.

A further object of the present invention is to utilize hardware already available on the spacecraft with the addition of digital sun sensors to provide an accurate three-axis attitude measurement.

A still further object of the present invention is to provide a cost-effective system which produces a three-axis spacecraft attitude measurement having sufficient accuracy to meet data relay satellite mission requirements, while not significantly altering the current spacecraft design.

Yet another object of the present invention is to provide a system with sufficient yaw sensing and control to maintain yaw pointing to off-nadir targets.

An additional object of the present invention is to provide a system which reduces the influence of significantly large time-varying disturbance torques on spacecraft attitude measurements.

In carrying out the above objects and other objects and features of the present invention a system is provided which produces a moderately accurate spacecraft three-axis attitude measurement. The system includes a sun sensor mounted on the spacecraft body and in communication with a processor, the sun sensor having a predetermined field-of-view and creating sun sensor signals indicative of a pitch-axis attitude and a yaw-axis attitude, while the sun is within the field-of-view. The system also includes means for combining signals generated by various sensors to determine a three-axis attitude measurement of the spacecraft. A method is also provided for use with the system disclosed and other similar systems.

This invention provides a highly cost-effective attitude measurement system for geosynchronous momentum bias satellites which need a continuously updated, moderately accurate, yaw measurement in addition to the usual roll and pitch measurements. The continuous yaw measurement enables control of the spacecraft yaw axis in the presence of disturbances such as antenna slews and large time-varying solar torques. The sun sensor is the only substantial addition to the hardware complement already available on the spacecraft. The sun sensor is necessary because the yaw measurement would otherwise be subject to large bias errors. In many respects, this invention is superior to other designs involving star sensors, continuously-running gyros, and sun sensors mounted on the solar wing.

The above objects and other objects, features, and advantages of the present invention will be readily appreciated by one of ordinary skill in the art from the following detailed description of the best mode for carrying out the invention when taken in connection with the accompanying drawings.

BEST MODE(S) FOR CARRYING OUT THE INVENTION

Figure 1:
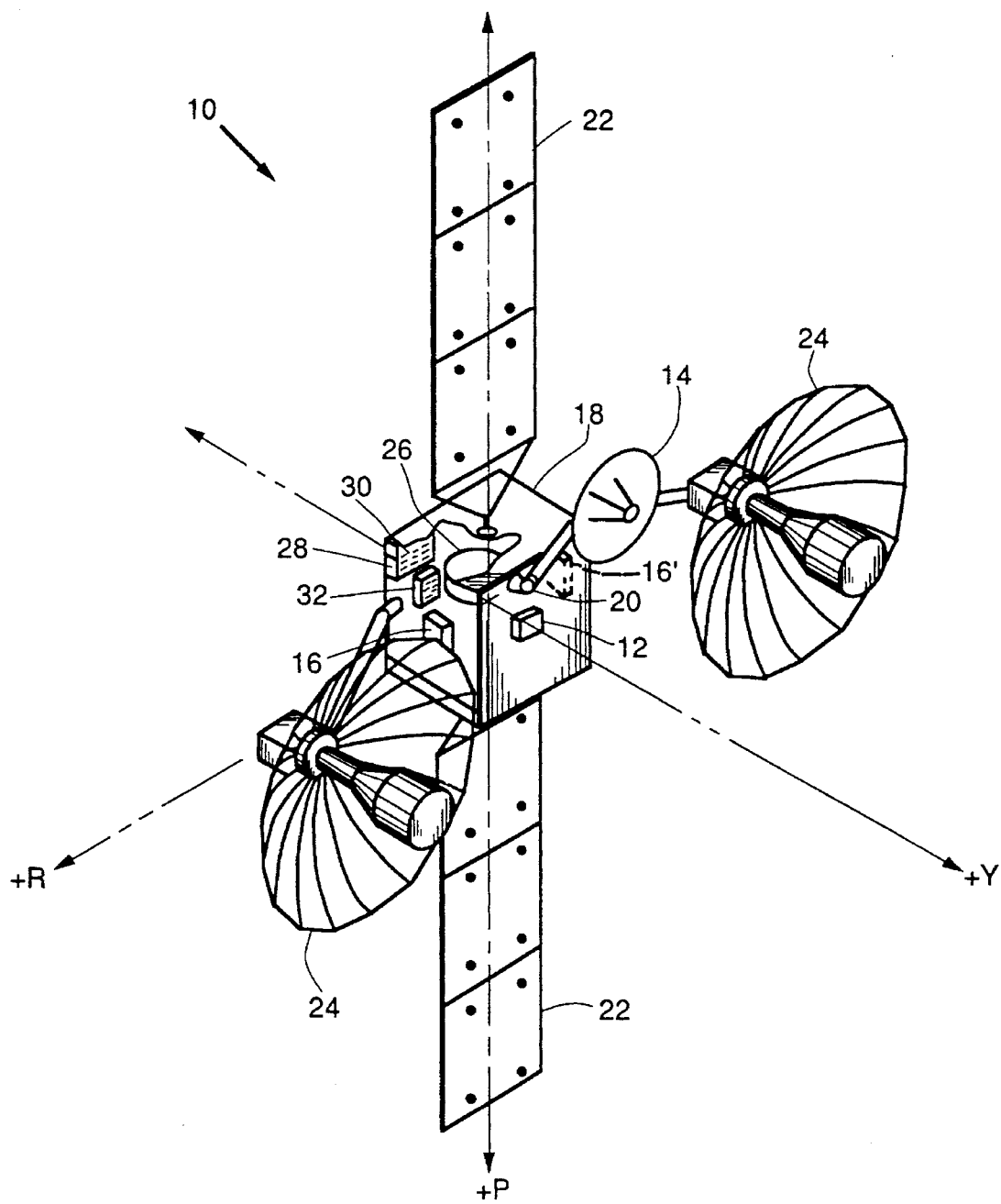
FIG. 1 is a perspective view of a typical geosynchronous momentum bias spacecraft according to the present invention.

As illustrated in FIG. 1, this invention combines three distinct attitude sensors to measure the three-axis attitude of a geosynchronous satellite 10. Satellite 10 is a communications satellite in geosynchronous Earth orbit. The system and method of the present invention are is particularly suitable for equatorial geosynchronous orbit applications utilizing momentum bias spacecraft, and can also accommodate inclined geosynchronous orbits. However, it would be more difficult to utilize the system and method of the present invention with spacecraft in other orbits such as polar, low Earth orbit, Molniya, or the like. This is due to the fact that a fundamental precept of this invention involves an attitude reference which is derived from a ground-based radio-frequency (RF) beacon located at a fixed position with respect to the Earth center as viewed from the satellite.

As illustrated in FIG. 1, the sensors on satellite 10 include an Earth sensor 12, a space-to-ground communication link (SGL) antenna 14, and at least one sun sensor 16 mounted to the central spacecraft body 18. In one embodiment of the present invention, at least one additional sun sensor 16' (shown in phantom) is mounted on spacecraft body 18, to provide redundancy while also increasing the availability of a sun sensor signal. Thus, this embodiment provides an increased accuracy, higher bandwidth pointing reference which is available a greater percentage of the time so as to allow more frequent calibrations of the spacecraft sensors, as described in greater detail below. Furthermore, the redundancy of additional sun sensors provides a once-per-orbit sun sensor reference even if one of the sun sensors fails.

Typically, SGL antenna 14 is mounted to body 18 of satellite 10 via a gimbal and resolver arrangement 20, as is well known in the art. Satellite 10 also includes one or more solar wings 22 and communication antennas 24 which are mounted to central body 18, as well as a momentum wheel 26, which is disposed within body 18. Momentum wheel 26 rotates about the pitch axis P being in the same plane as the yaw axis Y and the roll axis R, as explained in greater detail below. The reference coordinate system illustrated in FIG. 1 has its origin at the center of spacecraft body 18.

Earth sensor 12 creates an attitude reference signal for measurement of the spacecraft roll and pitch attitudes with respect to the Earth center (nadir). Preferably, the boresight of the Earth sensor is positioned along spacecraft yaw axis Y, which nominally points to the Earth nadir $N_E$.

The SGL antenna 14 is pointed at a target ground station $S_1$ and includes a companion communications package 28. This communications package includes an SGL autotrack sensor 30 for measuring azimuth and elevation attitude errors of SGL antenna 14 with respect to an RF beacon located at ground station $S_1$. However, ground station $S_1$ is normally offset from Earth nadir $N_E$ such that SGL autotrack sensor 30 measures roll and pitch in a slightly different coordinate frame than that of Earth sensor 12. The combination of SGL autotrack sensor 30 and Earth sensor 12 provide roll, pitch, and a weakly coupled yaw measurement as explained in greater detail below.

When ground station $S_1$ is at the sub-satellite point, ground station $S_1$ appears to be collinear with Earth nadir $N_E$ as viewed from the satellite. In this case, the azimuth and elevation measurements of SGL autotrack sensor 30 are identical to spacecraft roll and pitch, respectively, as measured by Earth sensor 12. Thus, no additional attitude information is derived from SGL autotrack sensor 30 in this situation. Typically, however, SGL autotrack sensor 30 is less noisy and therefore more accurate than Earth sensor 12. As a result, the roll and pitch measurements obtained from SGL autotrack sensor 30 are preferred over those of Earth sensor 12.

Figure 2:
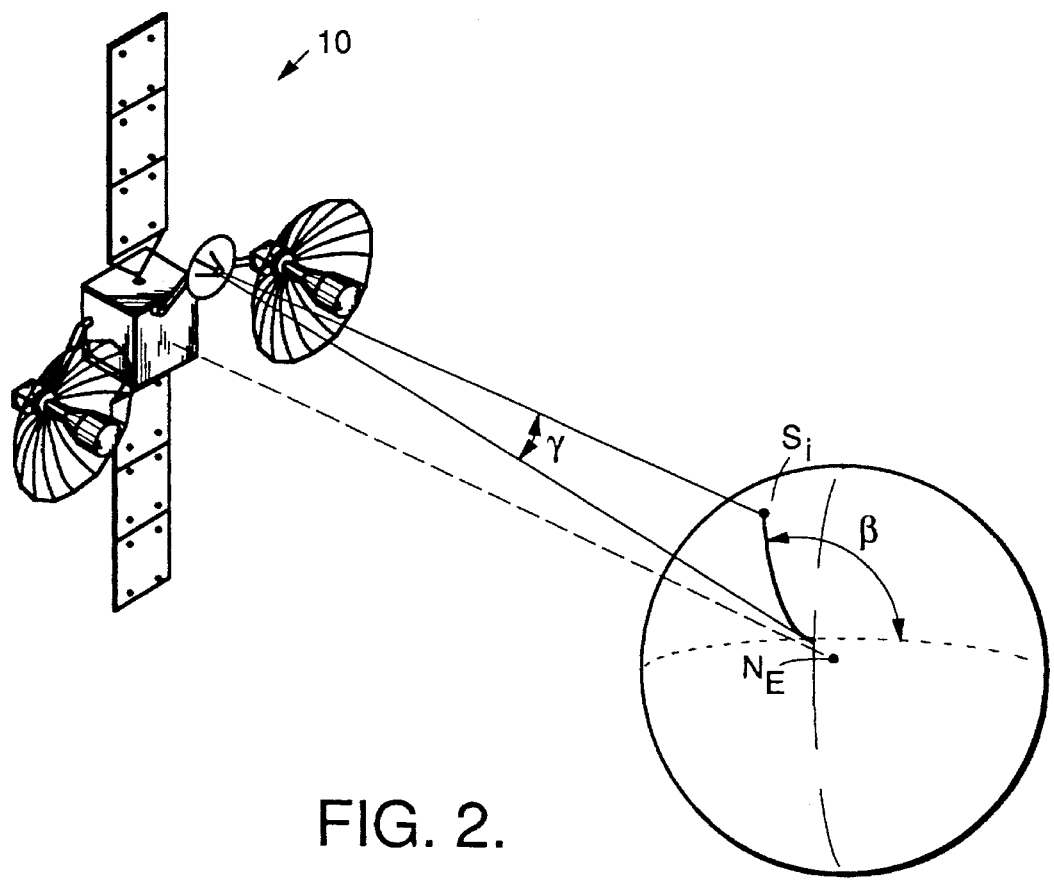
FIG. 2 illustrates the spacecraft-earth geometry for determining a three-axis attitude measurement utilizing the present invention.

Typically, however, the spacecraft orbital location and ground station $S_1$ location will be selected so that ground station $S_1$ is offset as far as possible from Earth nadir $N_E$. The maximal separation is achieved when ground station $S_1$ is on the horizon as viewed from satellite 10. This yields a separation angle $\gamma$ of about 8°. As illustrated in FIG. 2, the separation angle $\gamma$ is defined as the angle between Earth nadir $N_E$ and ground station $S_1$, with its vertex located at satellite 10. If the spacecraft is not in a perfect equatorial geosynchronous orbit (for example, if it is in an inclined orbit), ground station $S_1$ will appear to move with respect to Earth nadir $N_E$. In this case, the predicted reference position of ground station $S_1$ must be known. The apparent position of ground station $S_1$ as measured by SGL autotrack sensor 30 must then be compared with this predicted reference position.

Preferably, a gimbal and resolver arrangement 20 is used for steering SGL antenna 14 in order to accommodate different ground stations. A resolver (not specifically illustrated) or other measuring device is used to measure the SGL gimbal angle with respect to satellite central body 18, as is well known in the art. Alternatively, the SGL gimbal may be driven by a stepper motor so that its angle can be tracked by counting the number of steps commanded, as is also well known in the art.

If the spacecraft is in an inclined geosynchronous orbit, the gimbal may be used to steer SGL antenna 14 during a daily cycle to track out the ground station's apparent motion. In this case, SGL antenna 14 is pointed to ground station $S_1$ while the Earth sensor 12 (which is fixed to spacecraft central body 18) points to Earth nadir $N_E$. If the position of ground station $S_1$ and the orbital position of the space-craft are known prior to launch and will not substantially change, gimbal and resolver arrangement 20 may be unnecessary. In this case, the orientation of the SGL antenna may be fixed prior to launch. However, the spacecraft must also be in a substantially equatorial (non-inclined) geosynchronous orbit to utilize the fixed SGL antenna arrangement.

As illustrated in FIG. 1, sun sensor 16 is mounted to the spacecraft central body 18. Any of a number of commercially available precision sun sensors may be utilized. For example, the Adcole Digital Fine Sun Sensor (DFSS) manufactured by Adcole Corporation of Marlborough, Mass. could be used.

Sun sensor 16 provides a direct measurement of spacecraft yaw (and, incidentally, pitch) to enable accurate calibration of the SGL and Earth sensors once per orbit. Preferably, this sensor is positioned with its boresight (the center of its field of view) collinear with spacecraft roll axis +R, but this may not be possible due to antennas or other hardware obstructing the field of view. Alternatively, sun sensor 16 may be canted "back" (i.e. away from the positive roll axis +R toward the negative yaw axis −Y), so that its boresight is typically displaced approximately 30° from positive roll axis +R. Also preferably, sun sensor 16 (and therefore its boresight) is offset from the spacecraft yaw axis toward positive roll axis +R, as illustrated in FIG. 1.

Typically, sun sensor 16 would have a square field of view of 64° by 64°, although other configurations are possible without departing from the spirit or scope of the present invention. In order to derive attitude measurements from sun sensor 16, a model of the ephemeris of the sun must be used to determine a predicted reference position of the sun assuming a perfect spacecraft attitude. The measured spacecraft attitude is the difference between this predicted reference position and the actual spacecraft attitude.

By incorporating at least one precision sun sensor into the control strategy, this design has sufficient accuracy to meet typical relay satellite mission requirements (approximately 0.05° in roll and pitch, 0.25° in yaw). The system performance parameters of the present invention are developed in greater detail below.

In operation, during each day (each Earth orbit), the spacecraft rotates so that the sun appears to revolve around the spacecraft in azimuth about the pitch axis. In particular, the sun passes through the field of view of sun sensor 16 once each orbit. Therefore, there are two primary modes of operation corresponding to whether or not the sun is in the field of view of sun sensor 16.

In the first mode of operation (when the sun is not in the field of view of sun sensor 16), Earth sensor 12 and SGL autotrack sensor 30 are available to determine the spacecraft attitude. Each of these sensors measures two axes of attitude, in slightly different coordinate systems. In theory, the measurements from any two sensors measuring two axes each in different directions can be combined to create a measurement of all three spacecraft attitude axes.

As the boresight axes of the two sensors become close to collinear, it becomes more difficult to use their measurements to measure the attitude about the common boresight. In a limiting sense, if the boresight axes are exactly collinear they measure the same two attitude axes and cannot be used to measure the third axis (which should be the boresight axis of the sensors). Thus, if a three-axis attitude measurement is required during these periods, an alternative method must be utilized.

Preferably, Earth sensor 12 is oriented toward the Earth nadir $N_E$ and measures spacecraft roll and pitch attitudes. SGL autotrack sensor 30 is oriented toward ground station $S_1$, which is offset from Earth nadir $N_E$ by up to 8°. This separation enables the combination of measurements from SGL autotrack sensor 30 and Earth sensor 12 to measure spacecraft roll and pitch. This combined measurement is somewhat better than measurements obtained utilizing either sensor alone. This technique may also be used to provide a coarse measurement of the spacecraft yaw attitude.

During the first mode of operation, the yaw attitude measurement is very sensitive to small errors or biases in SGL autotrack sensor 30 and Earth sensor 12. Over a typical orbit, there will be incremental accumulation of these sensor biases, resulting in significant yaw pointing errors. Sun sensor 16 provides an accurate yaw attitude reference once per orbit which can be used to update biases of Earth sensor 12 and SGL autotrack sensor 30. This, in turn, provides an update of the yaw measurement bias when the sun is not in the field of view. Because the sun sensor measurement is available once per orbit (typically for several hours each orbit), the longest time over which it is necessary to operate utilizing only measurements from Earth sensor 12 and SGL autotrack sensor 30, is less than 24 hours. This is a significant improvement over prior art control strategies.

In the first mode of operation, since the sun is not in the field of view of sun sensor 16, SGL autotrack sensor 30 and Earth sensor 12 are used. In this case, two 2-axis sensors are available to determine the three-axis attitude. A fully optimal, general three-axis attitude determination can be computed by standard techniques. However, an approximate solution may be appropriate for small spacecraft attitude angles and a small off-nadir location of ground station $S_1$.

Typically, a processor 32, which may include hardware circuitry and software instructions, is mounted within spacecraft body 18. The processor 32 executes a predetermined set of instructions to compute measurements and control operation of the spacecraft. Alternatively, computations and commands may be determined by a ground station processor. Results are then relayed to the spacecraft via a communications link. The approximate solution for small spacecraft attitude angles and a small off-nadir location of ground station $S_1$ is given by:

$$\hat{\phi} = \left[ \frac{1}{\sigma_{SGL}^2 + \sigma_{ES}^2} \right] [\sigma_{SGL}^2 \phi_{ES}^m + \sigma_{ES}^2 \phi_{SGL}^m] \quad (1)$$

$$\hat{\theta} = \left[ \frac{1}{\sigma_{SGL}^2 + \sigma_{ES}^2} \right] [\sigma_{SGL}^2 \theta_{ES}^m + \sigma_{ES}^2 \theta_{SGL}^m]$$

$$\hat{\psi} = \frac{(\phi_{ES}^m - \phi_{SGL}^m)\cos\beta + (\theta_{SGL}^m - \theta_{ES}^m)\sin\beta}{\sin\gamma}$$

where:

$\hat{\phi}, \hat{\theta},$ and $\hat{\psi}$ are the approximate least-squares spacecraft attitudes using the available measurements;

$\phi_{ES}^m$ and $\theta_{ES}^m$ are the Earth sensor roll and pitch measurements respectively;

$\phi_{SGL}^m$ and $\theta_{SGL}^m$ are the SGL autotrack sensor elevation and azimuth measurements, respectively;

$\pi_{ES}$ is the Earth sensor noise, or error, standard deviation (assumed to be equal for roll and pitch);

$\gamma$ and $\beta$ define the SGL ground station $S_1$ location; and $\sigma_{SGL}$ is the SGL autotrack sensor error standard deviation (assumed to be equal for elevation and azimuth).

The parameters $\sigma_{ES}$ and $\sigma_{SGL}$ can be selected so as to weight the measurements from SGL autotrack sensor 30 and Earth sensor 12 in a particular way depending upon the application. For example, the weighting could be selected on the basis of the characteristic high-frequency random noise of the sensor. Alternatively, the weighting could depend on slowly-varying biases, depending on which term dominates the total spacecraft pointing error. Of course, a more sophisticated filtering scheme may be used which treats high-frequency and low-frequency sensor errors separately.

In some instances, further simplifying approximations may be incorporated into the sensing equations which may further clarify the character of the equations. For example, if ground station $S_1$ is on the equator and satellite 10 is in an equatorial orbit, equation (1) for the yaw measurement becomes:

$$\psi = \pm \frac{\phi_{ES}^m - \phi_{SGL}^m}{\sin\gamma} \quad (2)$$

The "+" sign in equation (2) is used when the ground station, viewed from the satellite, is East of earth nadir $N_E$ ($\beta=0°$). The "−" sign in equation (2) is used when the ground station, viewed from the satellite, is West of earth nadir $N_E$ ($\beta=180°$).

Furthermore, if the characteristic noise and error of Earth sensor 12 and SGL autotrack sensor 30 are equal ($\sigma_{SGL}=\sigma_{ES}$) then the equations for the roll and pitch measurements become:

$$\hat{\phi} = \tfrac{1}{2}[\phi_{ES}^m + \phi_{SGL}^m] \quad (3)$$

and $$\hat{\theta} = \tfrac{1}{2}[\theta_{ES}^m + \theta_{SGL}^m] \quad (4)$$

respectively.

In the second mode of operation (when the sun is within the field of view of sun sensor 16), sun sensor 16 measures the spacecraft attitude about the axes orthogonal to the line extending from the spacecraft to the sun. With sun sensor 16 oriented as illustrated in FIGS. 1 and 2, this provides highly accurate measurements of spacecraft pitch and yaw attitudes. Any three linearly independent measurements are sufficient to determine the spacecraft three-axis attitude. The addition of sun sensor 16 provides a total of six measurements to determine the three-axis attitude. These measurements consist of azimuth and elevation measurements provided by Earth sensor 12, sun sensor 16, and SGL autotrack sensor 30.

In the second mode of operation, three 2-axis sensors are available to determine the three-axis attitude. Again, a fully optimal, general three-axis attitude determination solution can be computed by standard techniques including weighting of the different measurements for their relative errors and noises, as is known. However, a general attitude determination leads to some fairly involved calculations which may not be practical or desirable for the processor onboard the spacecraft to perform.

Sun sensor 16 is typically a more precise device than either Earth sensor 12, or SGL autotrack sensor 30. This characteristic is utilized to develop simpler attitude measurement schemes for use in onboard control algorithms. For example, for attitude control, only the sun sensor and either SGL autotrack sensor 30 or Earth sensor 12 need to be utilized. Typically, SGL autotrack sensor 30 is better than Earth sensor 12 for this purpose. Then, the general three-axis attitude determination is solved utilizing the two selected sensors. Thereafter, this solution is also utilized to calibrate the remaining sensor.

As another example, sun sensor 16 may be used to measure the spacecraft yaw and pitch attitudes. Spacecraft roll is measured by either Earth sensor 12 or SGL autotrack sensor 30. Again, the general three-axis attitude determination method may be employed utilizing the two selected sensors. The solution may then be employed to calibrate the pitch measurements generated by Earth sensor 12 and SGL autotrack sensor 30. In a similar manner, the roll measurement from the remaining sensor may also be calibrated.

Of course, combinations of measurements other than those listed here may be used to optimize the compromise between simplicity and accuracy.

In a spacecraft incorporating the control system of the present invention, uncorrupted measurements of all three spacecraft axes are available during periods when the sun is within the field of view of sun sensor 16. In this case, a conventional spacecraft control system may be utilized which incorporates sun sensor 16. Control performance of each axis is limited by the performance of the sensor and actuator in that axis, and the three axes can be treated as essentially decoupled control problems.

During periods when the sun is not within the field of view of sun sensor 16, a different control strategy may be necessary. When used to derive a yaw measurement, any noise in Earth sensor 12 or SGL autotrack sensor 30 will be amplified by a factor of $$\frac{1}{\sin\gamma}$$

(see the "$\sin\gamma$" in Equation (2)). This factor is at least 6.6 for a spacecraft in geosynchronous orbit. This corresponds to the maximum value of $\gamma$ of 8.7°. Typically, however, $\gamma$ would be about 8° and ($1/\sin\gamma$) would be about 7.

In one alternative embodiment of the present invention, two ground stations located at well-separated locations on the Earth disk are utilized (see $S_1$ and $S_2$ in FIG. 2). In addition, two SGL antennas and corresponding SGL autotrack sensors are included on the spacecraft. In this embodiment, the yaw pointing reference may be more accurate since the angle between the ground stations as viewed from the spacecraft may be up to 17.4°.

Thus, in the embodiment described immediately above, the errors in each SGL autotrack sensor would be multiplied by at least 1/sin 17.4°, or a minimum of only 3.3 instead of the factor 6.6 achievable using the Earth sensor. In fact, the Earth sensor may be eliminated entirely, although at least a rudimentary Earth sensor is desirable to initially acquire Earth pointing and to provide a backup for the SGL sensors should the Earth link be lost.

Measurements produced by Earth sensor 12 typically have significant amounts of random noise. Therefore, this scheme leads to a very noisy yaw measurement. Thus, the yaw control loop for the spacecraft will have a fairly low bandwidth compared to the roll and pitch control loops so that the yaw control loop is less sensitive to the noise. A typical yaw control time constant with this scheme might be several minutes, compared to a few seconds or tens of seconds for the roll and pitch time constants. For this reason, it is helpful to have a pitch momentum bias.

Over short periods, the gyroscopic stiffness created by a sufficient pitch momentum bias will resist perturbations to yaw pointing. Over longer periods, yaw attitude errors can be measured and corrected by Earth sensor 12 and SGL autotrack sensor 30. Thus, over the short term, the yaw pointing accuracy is determined by the size of the momentum bias.

The control strategy of the present invention provides uncorrupted attitude measurements of spacecraft roll and pitch from Earth sensor 12, and SGL autotrack sensor 30, at all times. The yaw axis measurement, however, is significantly corrupted due to the noise amplification. On a momentum bias spacecraft, the dynamics of the spacecraft pitch axis are essentially decoupled from the dynamics of the spacecraft roll and yaw axes. Therefore, a control system for pitch axis P may be designed independently from the yaw axis Y and roll axis R. Standard control system design techniques such as PID (proportional-integral-derivative) control may be utilized.

The momentum bias does, however couple the dynamics of the roll axis R and yaw axis Y. The roll and yaw dynamics can therefore be considered a coupled, two-input, two-output system. Furthermore, in the system of the present invention, the measurements of the control variables (roll and yaw attitude angles) are directly available. Thus, a feedback controller may be designed for the roll/yaw dynamics using conventional techniques, such as a linear-quadratic regulator with a linear-quadratic-gaussian observer.

Figure 3:
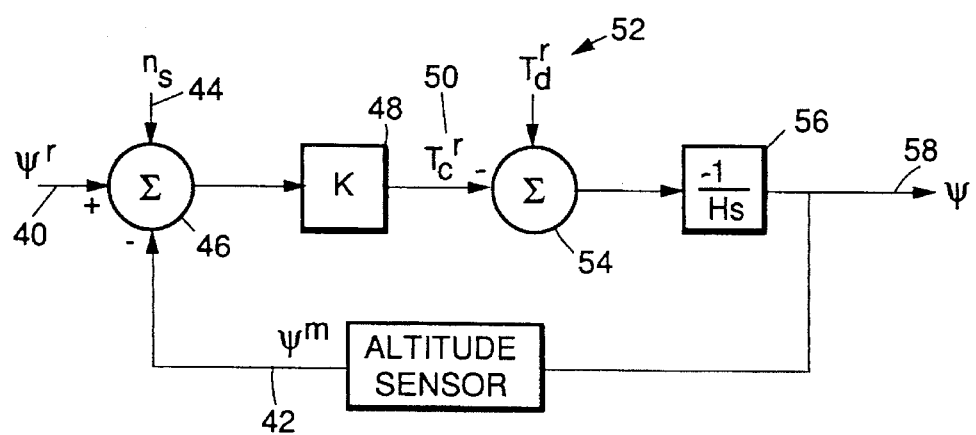
FIG. 3 is a simplified block diagram of the yaw axis dynamics of a closed-loop spacecraft control system according to the present invention.

The yaw axis portion of any such control system will have limited gain and bandwidth due to the significant sensor noise present in this channel. The simplified control system represented by the block diagram of FIG. 3 provides some insight into the performance characteristics possible utilizing the present invention. The coupling of the roll and yaw dynamics is ignored since these axes are assumed to be stabilized by the coupled roll-yaw control system, as explained in detail below.

The illustrative control system of FIG. 3 is a yaw axis control system with a simplified single-axis dynamics model (coupling between roll and yaw axes is ignored). This block diagram illustrates some of the tradeoffs in the yaw axis control system design while demonstrating typical bandwidths achievable with this control system. The dynamics are represented by the yaw axis precessional dynamics.

A yaw attitude reference signal 40 is combined with the negative feedback from the measured yaw attitude 42 and yaw sensor noise 44 at summing block 46. The result is then multiplied by a gain factor 48 to produce a commanded roll torque 50. This result is combined with a roll axis disturbance torque 52 at summing block 54 before being multiplied by a simplified yaw axis dynamics model 56 (where H is the magnitude of momentum stored in the momentum wheel) to produce the actual spacecraft yaw attitude 58. If the momentum wheel spins about the negative spacecraft pitch axis, H is considered to be a positive number.

According to the dynamical model illustrated in FIG. 3, when a constant fixed roll-axis disturbance torque $T_d^r$ is applied to the spacecraft, the pitch axis (and thus the momentum vector) precesses about the yaw axis at a rate proportional to that disturbance torque. This dynamics model neglects the effects of orbital coupling between roll and yaw (since this is much slower than the time constant of the yaw control system), and nutational coupling between roll and yaw (since this is stabilized by the coupled roll/yaw control system). Thus, this simple model is sufficient for measuring the sensitivity to sensor noise and disturbance torques.

The effect of a disturbance torque $T_d^r$ on a particular axis, such as the yaw axis, may be represented as follows:

$$\psi(t) = \frac{1}{H} \int_0^t T_d^r(\tau) d\tau. \tag{5}$$

If $T_d^r(\tau)$ is a constant, then $$\psi(t) = \psi(0) + \frac{1}{H} T_d^r t. \tag{6}$$

The Laplace transfer function of these dynamics is:

$$\frac{\psi(s)}{T_d^r(s)} = \frac{1}{Hs} \tag{7}$$

All that is needed, then, to stabilize these dynamics is a constant feedback gain K, as illustrated in FIG. 3. Of course, a more complex feedback compensator such as PID might be used, but this simple model effectively illustrates the tradeoffs of the system. The closed-loop transfer functions of the system are:

$$\frac{\psi(s)}{T_d^r(s)} = \frac{1/H}{s + K/H} \tag{8}$$

$$\frac{\psi(s)}{n_s(s)} = \frac{K/H}{s + K/H}$$

where $n_s(s)$ is the effective yaw sensor noise, including the effect of amplification of SGL autotrack sensor 30 and Earth sensor 12 by:

$$\frac{1}{\sin\gamma}. \tag{9}$$

The closed-loop time constant of this system is given by:

$$\tau = H/K. \tag{10}$$

Typical values for the key parameters of this system include:

H, spacecraft momentum bias=60 N-m-sec;

$\phi_n$, sensor noise power spectral density for the yaw sensor=0.001 deg$^2$/Hz; and $T_d^r$, the roll disturbance torque, is bounded by 100×10$^{-6}$ N-m.

The standard deviation of the spacecraft yaw attitude due to the sensor noise can be computed as follows:

$$\sigma_\psi = \sqrt{\frac{\phi_n K/H}{2}} \tag{11}$$

Typically, it is desirable to limit the spacecraft attitude error due to noise. The limiting value is determined by the need to reduce power dissipation or torquing of the spacecraft control actuators. For example, suppose it is desirable to limit the 3-σ attitude error due to sensor noise to 0.004°. Then, the feedback gain K can be no greater than 0.2 N-m/rad (or equivalently 0.003 N-m/deg). The closed-loop time constant is then τ=K/H=(60 N-m-sec)/( 0.2 N-m/rad)= 300 sec =5 minutes. Finally, the steady-state attitude error due to a step change in the disturbance torque is:

$$\psi_{ss} = \frac{T_d}{K}. \tag{12}$$

Thus, for example, if the roll disturbance torque is 100 micro N-m, which is a conservative upper bound for solar and other steadily-acting disturbance torques on most communications satellites, the steady-state yaw error is only 0.033 deg. This is very good performance as compared to currently available control strategies. By contrast, in the absence of any control, a fixed yaw disturbance torque of 100 micro N-m would cause a yaw attitude error of 1.3° (calculated as $\psi_{ss}=T_d/H\omega_0$, where $\omega_0$ is the orbit rate, $7.27\times10^{-5}$ rad/sec).

As previously discussed, currently available geosynchronous momentum bias satellites have no direct yaw sensing capability. These spacecraft control both the roll and yaw axes using only a roll sensor by taking advantage of the roll-yaw coupling provided by the orbital dynamics and momentum bias. Typically, control systems on these spacecraft employ a yaw axis control having a time constant of two to three hours. The present invention provides for a time constant of only 5 minutes. Furthermore, the pointing errors of currently available satellites, due to large time-varying roll torques, would also be correspondingly larger those associated with the control system of the present invention.

The present invention enables a yaw pointing accuracy of about 0.25° A typical Earth sensor has errors which vary by about 0.02° over a day due to a variety of changes in operating conditions, such as Earth radiance changes. Also, a typical SGL autotrack sensor would have diurnal errors of about 0.02° due to antenna thermal distortions, electronic offsets, and the like. The RSS (root-sum-square) of these error sources is about 0.03°, which, when multiplied by the factor of 7 in Equation (2), is approximately 0.21°. This term would most likely dominate the total allowable yaw error since the pointing error due to disturbance torques is limited by the feedback action described above.

Depending on the particular spacecraft parameters and operations, there will be some pointing error due to disturbance torques. All errors mentioned above would typically combine (in an RSS sense) to a total yaw error in the neighborhood of 0.25°.

Alternatively, rather than implementing the control system of the present invention to improve the yaw pointing accuracy of a spacecraft, less demanding pointing requirements may be achieved utilizing a smaller momentum bias. A smaller momentum bias is desirable in that it is lighter in weight and requires less power to operate. The resulting decrease in the gyroscopic stiffness of the spacecraft is accommodated by the improved control provided by the control system of the present invention.

It is understood, of course, that while the form of the invention herein shown and described includes the preferred embodiment of the invention, it is not intended to illustrate all possible forms thereof. It will also be understood that the words used are descriptive rather than limiting, and that various changes may be made without departing from the spirit and scope of the invention disclosed.

What is claimed is:

1. A system for determining a three-axis attitude measurement of a spacecraft, the spacecraft including a spacecraft body having pitch, roll, and yaw axes, means for receiving signals indicative of spacecraft operating conditions, an Earth sensor disposed within the spacecraft body for creating attitude reference signals indicative of a roll-axis attitude and a pitch-axis attitude, and means for generating error signals indicative of an azimuth attitude error and an elevation attitude error with respect to a first target ground station, the generating means being disposed within the spacecraft body, the system comprising:

a sun sensor mounted on the spacecraft body having a predetermined field-of-view and being operative to create sun sensor signals indicative of a pitch-axis attitude and a yaw-axis attitude, while the Sun is within the field-of-view; and a processor, in communication with the sun sensor, the Earth sensor, and the means for generating error signals, for combining a plurality of signals selected from the group consisting of the attitude reference signals, the sun sensor signals, and the error signals, wherein the plurality of signals is selected based on an associated accuracy of the signals so as to determine a three-axis attitude measurement of the spacecraft while reducing three-axis attitude measurement error.

2. The system of claim 1 wherein the spacecraft is a momentum bias spacecraft for use in a geosynchronous orbit application, the system further comprising:

a momentum wheel disposed within the spacecraft body for providing a momentum bias to resist disturbance torques acting upon the spacecraft, the momentum wheel being rotatable about the pitch axis of the spacecraft; and wherein the processor calibrates a sensor associated with an unselected signal of the group of signals based on the three-axis attitude determined using the plurality of selected signals.

3. The system of claim 1 wherein the means for generating error signals comprises:

an antenna movably mounted to the spacecraft body for receiving reference signals from the target ground station;

means for pointing the antenna toward the target ground station and maneuvering the antenna during a daily cycle to eliminate an apparent motion of the target ground station, the pointing means being mounted to the spacecraft body; and a sensor for measuring the azimuth and elevation attitude errors relative to the target ground station.

4. The system of claim 1 wherein the spacecraft is a momentum bias spacecraft for use in an inclined geosynchronous orbit application and wherein the means for generating error signals includes an antenna which is manueverable during a daily cycle to eliminate an apparent motion of the target ground station.

5. The system of claim 4 further comprising:

a gimbal attached to the antenna and attached to the spacecraft body for allowing positioning of the antenna relative to the spacecraft body;

an actuator in communication with the processor for positioning the antenna in response to a positioning command generated by the processor; and means for indicating an actual position of the antenna, the indicating means being in communication with the processor.

6. The system of claim 5 wherein the means for indicating includes a resolver for generating a signal representing movement of the antenna.

7. The system of claim 5 wherein the actuator is a stepper motor and the means for indicating is an integral component of the stepper motor.

8. The system of claim 2 further comprising at least one additional sun sensor mounted to the spacecraft body and in communication with the means for receiving, each of the at least one sun sensors having corresponding predetermined fields-of-view and being operative to create sun sensor signals indicative of a pitch-axis attitude and a yaw-axis attitude while the sun is within the corresponding field-of-view.

9. The system of claim 1 wherein the means for generating error signals generates signals indicative of an azimuth attitude error and an elevation attitude error with respect to a second target ground station.

10. The system of claim 9 wherein at least one sun sensor is a digital sun sensor.

11. A spacecraft having a system for determining a three-axis attitude measurement of the spacecraft, the spacecraft including a spacecraft body having pitch, roll, and yaw axes, means for receiving signals indicative of spacecraft operating conditions and generating command signals for controlling the spacecraft, the spacecraft comprising:

an Earth sensor disposed within the spacecraft body for creating attitude reference signals indicative of a roll-axis attitude and a pitch-axis attitude, the Earth sensor being in communication with the means for receiving signals;

means for generating error signals indicative of an azimuth attitude error and an elevation attitude error with respect to at least one target ground station, the generating means being disposed within the spacecraft body and in communication with the means for receiving signals;

a sun sensor mounted on the spacecraft body and in communication with the means for receiving signals, the sun sensor having a predetermined field-of-view and being operative to create sun sensor signals indicative of a pitch-axis attitude and a yaw-axis attitude, while the sun is within the field-of-view; and means for combining a plurality of signals selected from the group consisting of the attitude reference signals, the sun sensor signals, and the error signals, so as to determine a three-axis attitude measurement of the spacecraft and calibrating a sensor associated with an unselected signal based on the three-axis attitude measurement.

12. A method for determining a three-axis attitude measurement of a spacecraft, the spacecraft including a spacecraft body having pitch, roll, and yaw axes, means for receiving signals indicative of spacecraft operating conditions and generating command signals for controlling the spacecraft, an Earth sensor disposed within the spacecraft body for creating attitude reference signals indicative of a roll-axis attitude and a pitch-axis attitude, a sun sensor mounted on the spacecraft body and in communication with the means for receiving signals, the sun sensor having a predetermined field-of-view and being operative to create sun sensor signals indicative of a pitch-axis attitude and a yaw-axis attitude, while the sun is within the field-of-view, and means for generating error signals indicative of an azimuth attitude error and an elevation attitude error with respect to a first target ground station, the generating means being disposed within the spacecraft body, the method comprising:

determining a general three-axis attitude measurement utilizing signals generated by two components selected from the group consisting of the earth sensor, the sun sensor, and the means for generating error signals; and utilizing the general three-axis attitude measurement to calibrate a sensor associated with the selected signals.

13. The method of claim 12 wherein combining a plurality of signals includes determining an approximate solution to a general three-axis attitude measurement given by:

$$\hat{\phi} = \left[ \frac{1}{\sigma_{SGL}^2 + \sigma_{ES}^2} \right] [\sigma_{SGL}^2 \phi_{ES}^m + \sigma_{ES}^2 \phi_{SGL}^m]$$

$$\hat{\theta} = \left[ \frac{1}{\sigma_{SGL}^2 + \sigma_{ES}^2} \right] [\sigma_{SGL}^2 \theta_{ES}^m + \sigma_{ES}^2 \theta_{SGL}^m]$$

$$\hat{\psi} = \frac{(\phi_{ES}^m - \phi_{SGL}^m)\cos\beta + (\theta_{SGL}^m - \theta_{ES}^m)\sin\beta}{\sin\gamma}$$

where:

$\hat{\phi}, \hat{\theta},$ and $\hat{\psi}$ represent the approximate least-squares spacecraft attitudes;

$\phi_{ES}^m$ and $\theta_{ES}^m$ represent the Earth sensor attitude reference signals corresponding to roll and pitch, respectively;

$\phi_{SGL}^m$ and $\theta_{SGL}^m$ represent the error signals generated by the means for generating error signals corresponding to elevation and azimuth errors, respectively;

$\sigma_{ES}$ represents a standard deviation of noise generated by the Earth sensor;

$\gamma$ and $\beta$ represent angles defining the target ground station location; and $\sigma_{SGL}$ represents a standard deviation of the means for generating error signals.

14. The method of claim 13 wherein $\sigma_{ES}$ and $\sigma_{SGL}$ are selected so as to weight the measurements from the Earth sensor and the means for generating error signals, respectively.

15. The method of claim 13 wherein $\sigma_{ES}$ and $\sigma_{SGL}$ are selected depending upon a high-frequency random noise characteristic of the Earth sensor and the means for generating error signals, respectively.

16. The method of claim 13 wherein $\sigma_{ES}$ and $\sigma_{SGL}$ are selected depending upon slowly-varying biases of the Earth sensor and the means for generating error signals, respectively.

17. The method of claim 12 further comprising controlling the spacecraft based on the three-axis attitude measurement.

18. The method of claim 13 wherein combining a plurality of signals includes determining an approximate solution to a general three-axis attitude measurement.

19. The spacecraft of claim 11 wherein the sun sensor is a digital sun sensor.

* * * * *